Jan. 11, 1944.  R. P. SCHERER  2,339,114
METHOD OF FORMING AND FILLING CAPSULES
Filed March 5, 1940  2 Sheets-Sheet 1
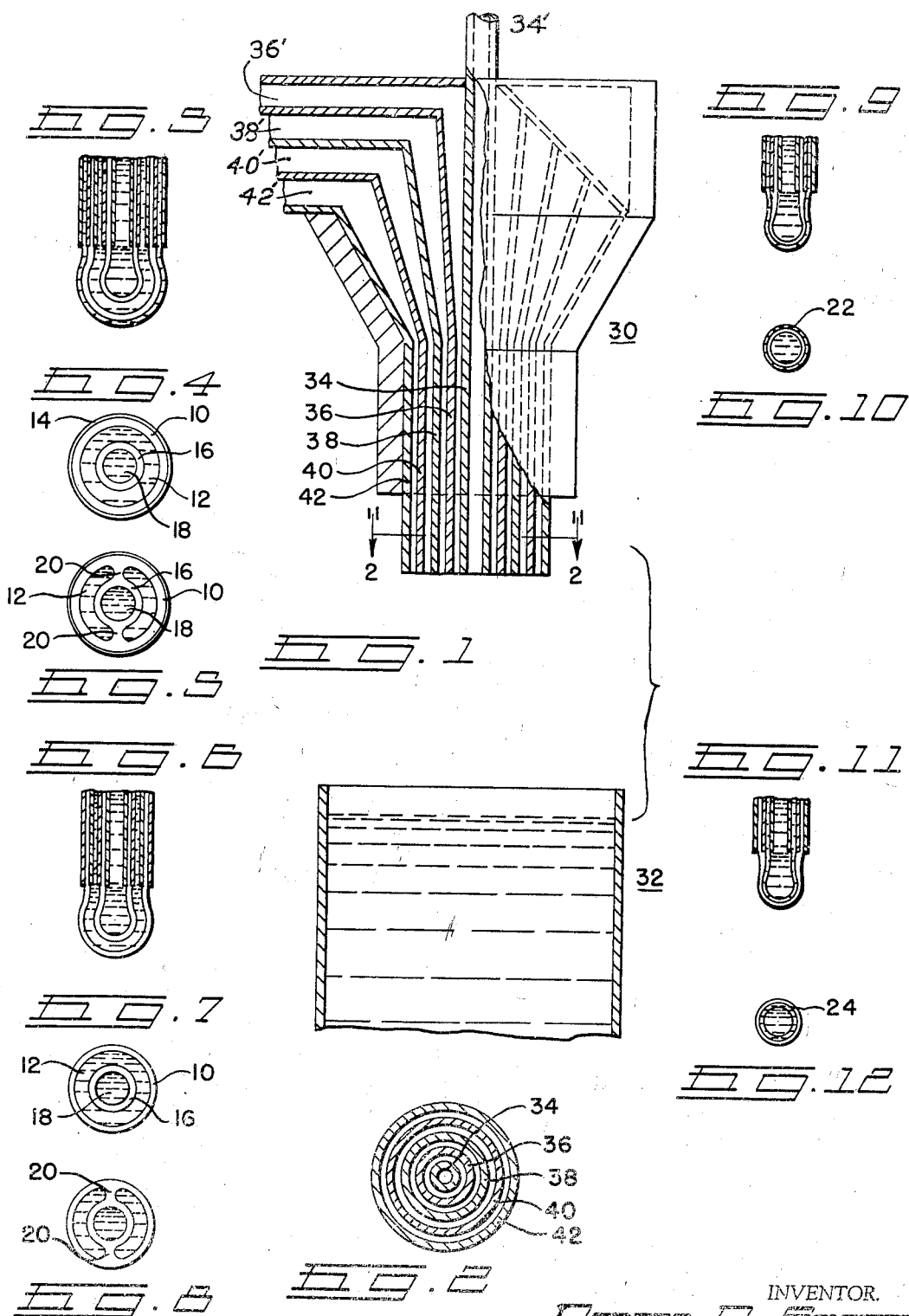
INVENTOR.
Robert P. Scherer
BY Parker & Burton
ATTORNEYS.

Jan. 11, 1944. R. P. SCHERER 2,339,114
METHOD OF FORMING AND FILLING CAPSULES
Filed March 5, 1940 2 Sheets-Sheet 2
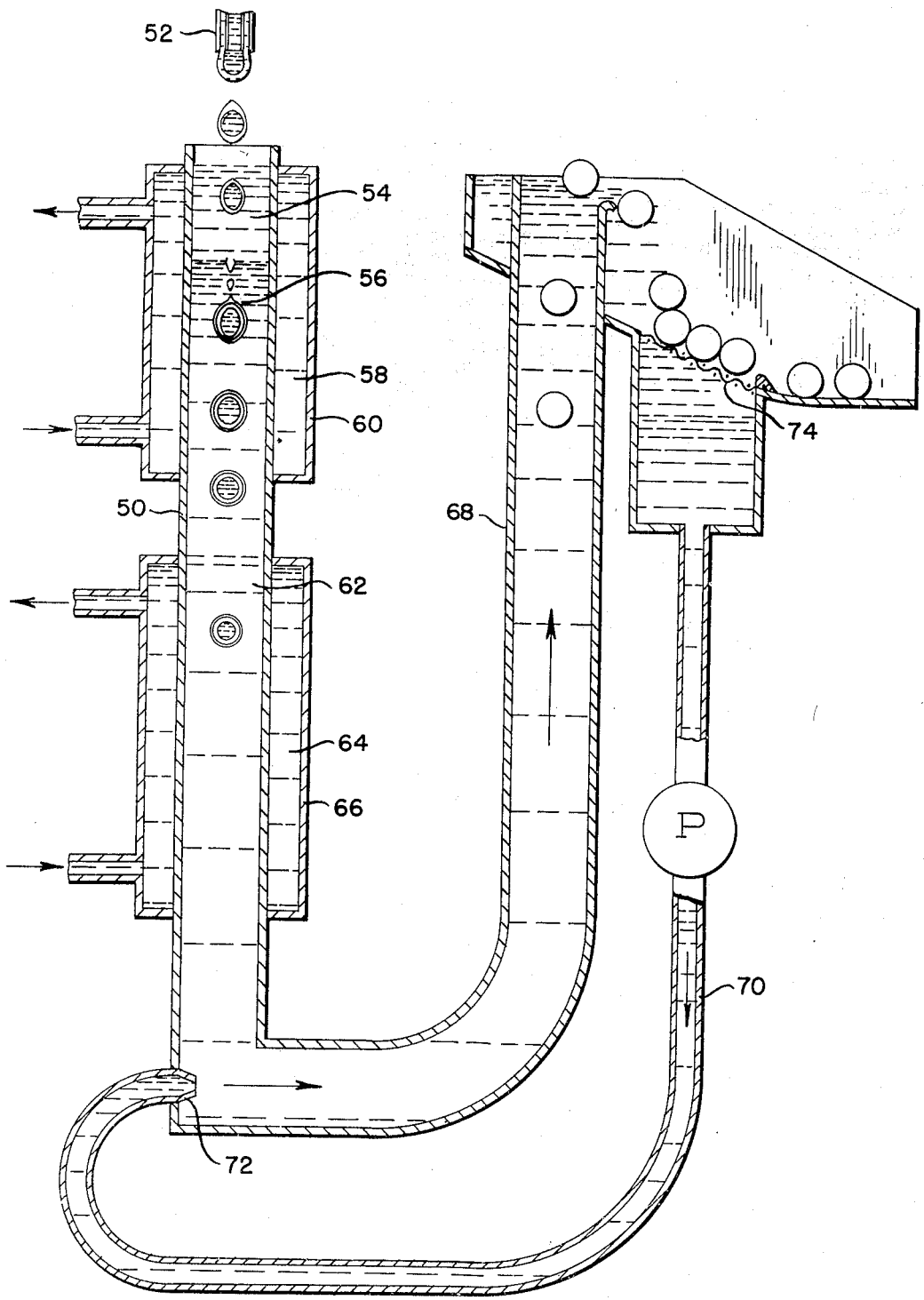
INVENTOR.
ROBERT P. SCHERER
BY
Parker & Burton
ATTORNEYS.

Patented Jan. 11, 1944

2,339,114

UNITED STATES PATENT OFFICE 2,339,114

METHOD OF FORMING AND FILLING CAPSULES

Robert P. Scherer, Detroit, Mich.

Application March 5, 1940, Serial No. 322,375

6 Claims. (Cl. 18—48)

This invention relates to the fabrication of capsules and particularly to a novel process for forming hermetically sealed capsules.

It is a primary object of this invention to provide a novel process for forming a new form of hermetically sealed filled capsules. These filled capsules have generally consisted of a solidified outer shell in which solid or fluid, usually a liquid, was capsulated. The present invention contemplates a novel process of fabricating a new form of hermetic capsule having added to the type of filled capsule above described an additional sealing means either in the form of a coating contiguous to the shell, providing a multi-walled capsule, or a separate shell wall inside the outside shell completely enveloping or dividing the filler content material therein into separate bodies. The provision of a coating on the capsule shell is especially desirable in those cases where the shell is subjected to attack by substances either on the outside or the inside of the shell and this invention discloses a new process of fabricating such a capsule. In such cases the coating forms a protective layer preventing or inhibiting the attack of the substance which it is desired to avoid.

In another type of filled capsule falling within the scope of this invention, the formation of a dividing wall inside the capsule body enables two or more kinds of filler substances to be enclosed within a single capsule in separate unmixed states until the dividing wall breaks down. This will be of special utility in those cases where it is desired to capsulate two or more substances which cannot or should not be mixed until actual use of the capsule is made. Two medicinal substances, for example, might be more effective if kept separate in the same capsule until taken internally when the shell walls are dissolved. This invention discloses a novel process of accomplishing this desired end.

The object of this invention is to provide a novel process of forming, filling, and sealing the new type of filled capsules described hereinabove. The apparatus required for carrying out the process is relatively simple and inexpensive and will result, if desired, in the formation of capsule bodies in a spherical form. The process and apparatus is in general similar to that described and claimed in my copending application, Serial No. 299,627, filed October 16, 1939, but differs therefrom in several important respects. In my copending application I described a liquid column immersion bath for treating capsules in the early stages of their formation. The filled capsules each consist of a shell of plastic material enclosing filler substance. These capsules are caused to be passed through the liquid column preferably, as described in my copending application, first through a heated liquid stratum where they take on a spherical shape and then through a cooler stratum where the capsule shells harden into the spherical form. In my copending application there is also described an extrusion apparatus for forming, filling, and sealing the capsules before they are introduced into the liquid column.

The present invention contemplates improvements in the process described in my copending application and particularly to improvements which provide filled capsules with an additional sealing element either in the form of a coating against one or the other sides of the shell or in the form of an additional wall inside the capsule dividing the filler content thereof into two separate non-miscible bodies. In the first instance the coating may be applied either against the inside or the outside surface of the capsule shell at the time the seal is formed. Novel means may be provided in the form of a novel extrusion apparatus for accomplishing this purpose or the liquid treatment may have a new stratum through which the capsule passes which applies a coating having the desired properties to the outside of the shell. In the second case, an interior wall separate from the shell wall may be formed by a novel process whereby two or more kinds of filler substances are included within the capsule on opposite sides of an interior wall. The improved process described herein is also capable of fabricating a particularly novel form of capsule having an inside shell entirely enclosed within the outside shell. In this new type of capsule the filler within the inner shell can be distinctly different from that between the inner and outer shell walls and kept separated until the shell is all broken down in use.

Various other objects, advantages and meritorious features of this invention will become more fully apparent from the following specification, appended claims and accompanying drawings, wherein, Fig. 1 is a view of an extrusion device and a liquid column forming a part of a capsule forming and filling apparatus constructed and operating in accordance with the teachings of this invention, Fig. 2 is a cross-sectional view of the extrusion device along line 2—2 of Fig. 1, Fig. 3 is a vertical cross-sectional view through one of the extrusion nozzles employed in my process and adapted when used therein to form a compound capsule having one capsule body within another and an outside coating around the shell of the larger capsule, Figs. 4 and 5 are cross-sectional views through capsule bodies fabricated as herein described and illustrating two different forms of capsules capable of being produced by the apparatus of Figs. 1, 2 and 3, Fig. 6 is a vertical cross-sectional view through another form of extrusion device employed in the process described and adapted to be used as herein set forth to form a compound capable having a capsule body within a larger capsule body but without an outside coating applied thereto, Figs. 7 and 8 are cross-sectional views through capsule bodies illustrating the two types of capsules formed by the extrusion apparatus of Fig. 6, in accordance with process described, Fig. 9 is a vertical cross-sectional view through another form of extrusion device usable in my novel process and adapted to form a single filled capsule body having an outside protective coating, Fig. 10 is a cross-sectional view through a capsule body illustrating the type of capsule formed by the extrusion device of Fig. 9, in accordance with the process described, Fig. 11 is a vertical cross-sectional view through an extrusion device usable in my process and adapted to form a capsule body comprising a single shell having an outside protective coating applied thereto, Fig. 12 is a cross-sectional view through the capsule body fabricated according to my improved process and illustrating the type formed by the extrusion device of Fig. 11, and Fig. 13 is a schematic view of a capsule extrusion apparatus and a liquid column illustrating a method of forming filled capsules and applying the coating to the outside of a capsule during its passage through the liquid column.

In Figs. 4, 5, 7, 8, 10 and 12 I have shown various forms of capsule bodies having in addition to the customary shell and filler content, a wall of material which, in the several instances illustrated, may be in the form of an outside or inside coating applied to the shell or may, in several of the other instances illustrated, assume an interior wall structure dividing the filler content material into two or more separate non-mixable bodies. In one particular instance, as illustrated in Figs. 4 and 5, the capsule body may be provided with both an outside protective coating and an interior circular wall dividing the filler content material of the capsule into two separate bodies.

The most complex form of capsule bodies illustrated is shown in Figs. 4 and 5. Since the remaining capsule bodies illustrated are of simpler construction and readily understood from the complex form, the latter will be described first for a complete understanding how all the parts are associated together.

Referring to Figs. 4 and 5, there is illustrated two forms of a novel compound capsule including a smaller capsule within a larger capsule each retaining their own fillers in unmixed state and a coating enveloping the outside shell of the larger capsule. The shell of the larger capsule is indicated at 10 and encloses filler content material 12 therewithin. An outside layer of coating is indicated at 14 forming a protective coating around the shell. As previously explained, the coating may have properties protecting the shell from attack by outside substances or may function as an additional seal, strengthening the shell against breakage in use.

Disposed within the fluid filler content 12 of the larger capsule is a second capsule body comprising a shell 16 and a filler content material 18 enclosed therewithin. In Figure 4 the inside shell 16 is floatingly disposed in the fluid content of the larger shell. In Figure 5 the inside shell 16 is tied to the outer shell by connecting sections or flanges indicated at 20, but in both cases the fluid contents 12 and 18 are kept completely separated from one another and cannot mix together until the inside shell wall breaks down. This form of capsule is especially desirable for capsulating substances which should not be mixed together until final use is made of the capsule. Medicinal substances, for example, which cannot or should not be mixed together until taken internally can be kept in a separated state by capsulating in this form. Likewise chemical substances which react together and change their properties can be kept separated by capsulating in this manner. For example, filler substances of alkaline and acid nature can be kept separate until the walls are dissolved in use. Also, for example, two substances, one which will effervesce in the presence of the other, can be capsulated in separate states until actual use of the capsule is made.

In Figs. 7 and 8 similar double capsules are illustrated but without a protective outer coating. In Fig. 10 a single capsule of the regular form is shown having an outside coating 22. In Fig. 12 a single capsule is shown provided with a coating 24 on the inside of the shell. In the last form of the capsule, a coating of this character is desirable when the substance capsulated has properties of attacking the shell material and tending to break it down. The protective coating 24 should be one that inhibits or prevents the action of such substances upon the shell. As an example, the shell attacking properties of certain chemical compounds, silver nitrate for instance, can be restrained by forming a wax coating on the inside surface of a gelatin shell. Similarly, gelatin shells can be protected from attack of the glycerin or water content of flavoring extracts by providing a wax coating over the inside of the shell.

The apparatus wherewith my improved process is carried out for forming the additional wall of material either against one or the other side of the shell or within the shell body comprises in general a plurality of tubes of different sizes arranged one within the other and terminating in open end condition. The discharging end sections of the tubes preferably extend vertically downwardly and all opening at their bottom edges on substantially the same level. Materials for forming the shell and the filler content are fed into the spaces between the tubes. If more than two tubes comprise the apparatus, alternate tubes will convey shell forming material and filler content material and as the material is discharged from the open end of the tubes a capsule body is formed, made up of a plurality of alternate layers of shell material and filler content material. Apparatus of the last character is especially desirable for forming the double type of capsules illustrated in Figs. 4, 5, 7 and 8.

Referring to Figs. 1 and 2, the apparatus comprises an extrusion device generally indicated at 30 and a liquid column generally indicated at 32 into which the material forming the capsules is passed after they are ejected from the extrusion device. Only the top of the liquid column is illustrated in Figure 1, it being assumed that the balance of the liquid column is like that illustrated in Figure 13 or in my copending application above referred to.

The extrusion apparatus is formed of a series of vertical tube sections of different diameters arranged one within the other. The apparatus illustrated in Figure 1 is adapted to form capsules of the type illustrated in Figs. 4 and 5, and comprises five tubes. The innermost tube 34 of the extrusion device conveys material for forming the filler content 18 of the smaller inside capsule body. The next innermost tube 36 is slightly larger than tube 34 and material for the shell wall 16 of the smaller inner capsule body is conveyed between the walls of the two tubes. The annular space between tube 36 and the next larger tube 38 forms a passage for the conduction of material for forming the filler content 12 of the larger capsule body. The next larger tube 40 serves like tube 36 to convey material for the shell wall 10 of the outer larger capsule wall body. The outside tube 42 provides an annular passage for the delivery of material for forming the protective coating 14 on the outside of the shell 10.

The upper ends of the tubes with the exception of the smallest tube 34 flare outwardly as shown. Opening into the upper ends of the flared sections are a plurality of conduits 36', 38', 40' and 42', each serving to deliver material to the tubes 36, 38, 40 and 42 respectively. The funneled character of the tubes reduces the cross-sectional area of the passage in each tube causing the material as it flows therethrough to distribute itself evenly throughout the tube so that it discharges from the open ends of the tube in equal increments on all sides of the tube. The materials for forming the shells and fillers may flow through the conduits 36' to 42' naturally but preferably they are forced into the discharge tube by pressure such as that produced by pump mechanism. Each material may be forced under pressure by a separate pump mechanism. All the pump mechanism may operate at the same time and exert the same pressure. It may be desirable in certain instances to have the pump mechanism for the shell material operate in advance of the pump devices for the filler material and for a longer period of time so that the shell material precedes the filler content in discharging from the nozzle.

Figure 13 illustrates the manner in which the extrusion device or nozzle of Figure 1 operates. The various materials are delivered down through their respective tubes and thence discharged through the open ends of the tubes. As the materials discharge from the open ends of these tubes, natural forces will cause the various layers, especially the shell forming layers, to constrict together. The construction may be such that the layers will coalesce together in the arrangement in which they are discharged from the nozzle and form a compound drop on the end of the nozzle. Natural attraction of similar substances may be relied upon to bring the different materials together to form a drop, or outside means may be employed to initially bring the layers together after which the natural affinity of similar substances will complete the drop formation.

The materials, especially the shell forming materials, are usually in a heated condition in order to cause them to flow satisfactorily. Gelatinous substances normally solid at room temperatures are generally used for forming the shell material. In initial stages this composite drop might be quite irregular in form and arrangement of the layers therewithin, and it is the purpose of the subsequent liquid column treatment to bring the drop into the more regular shape such as a sphere and rearrange the layers in a more uniform character within the capsule. After the composite drop has formed on the end of the extrusion device, it may be allowed to drop and fall by its own weight into the top of the liquid column 32 or mechanical means may be employed to aid in removing the drop from the extrusion device.

Severance of the drops from the nozzle by mechanical means is to be preferred in commercial operations. It is more exact and generally faster than allowing the drop to fall naturally. Mechanical severing means such as that illustrated in my copending application, Serial No. 299,627, filed October 16, 1939, can be used. It will not only sever the drops from the capsule forming materials in the nozzles but also form a surface upon which the first part of the next succeeding drop will spread causing like materials to coalesce together sealing the bottom side of the drop to be formed.

In order to cause the composite drop to pass downwardly through the liquid column 32, the combined specific gravity of all the parts of the drop should be greater than the specific gravity of the liquid in the column 32. Preferably the difference in specific gravity should be such that the drop falls relatively slowly through the liquid column. It is also important, if uniformity of capsule content is desired, that the specific gravity of the different parts of the drop be substantially the same. That is to say, the material forming the shells, coatings and fillers should be substantially the same specific gravity otherwise irregular displacement of these parts will occur during the passage of the drop through the liquid column resulting finally in the production of a capsule with the shell material thicker on one side than the other. Important factors contributing to the desirable uniform shape of capsule body formation are described in my copending application, Serial No. 310,259, filed December 20, 1939, including diagrammatic explanations of the various deformations which will occur if the specific gravities of the various parts of the capsule are distinctly different.

Instead of applying the outside coating 14 by means of an extrusion device of the type described above it is possible by a novel process and apparatus to apply this coating to the capsule body as the composite drop from the extrusion device passes through the liquid column. Apparatus illustrating this method of operation is shown in Figure 13. The liquid column 50 of this apparatus is divided into two or more strata, one of which 56 is capable of providing a coating upon the capsule body as the latter passes therethrough.

Referring to Figure 13, the extrusion device 52 is of the type capable of forming a single wall fluid filled capsule, although it is understood that any one of the various type previously illustrated and described can be substituted for this device if desired. The capsules formed by the extrusion first drops into the topmost strata 54 of the liquid column. This layer acts to check the fall of the capsule and is preferably of a temperature and specific gravity that the cap-